United States Patent [19]

Warshawsky

[11] 4,223,051
[45] Sep. 16, 1980

[54] DETACHABLE FINIAL LAMP PART

[75] Inventor: Jerome Warshawsky, Baldwin Harbor, N.Y.

[73] Assignee: I. W. Industries, Inc., Melville, N.Y.

[21] Appl. No.: 871,032

[22] Filed: Jan. 20, 1978

[51] Int. Cl.² .............................................. B44F 11/00
[52] U.S. Cl. ..................................... 428/28; D8/378; 52/57; 85/53
[58] Field of Search ......................... 85/35, 53, 54, 56; 428/28, 31, 19, 542; 52/57; D8/378

[56] References Cited

U.S. PATENT DOCUMENTS

| | | | |
|---|---|---|---|
| 2,008,047 | 7/1935 | Stangl | 428/28 |
| 2,457,336 | 12/1948 | Wilson | 425/577 |
| 2,538,483 | 1/1951 | Summers | 85/56 |
| 2,878,905 | 3/1959 | Langermeier | 85/35 X |
| 3,084,387 | 4/1963 | Tochner et al. | 425/351 |
| 3,091,810 | 6/1963 | Turner | 425/3 |
| 3,119,430 | 1/1964 | Di Rico | 85/35 X |
| 3,719,446 | 3/1973 | Cleevely | 425/438 X |

OTHER PUBLICATIONS

Page 66, The Title Page, and the Verso of the Title Page of Webster's Seventh New Collegiate Dictionary, G. & C. Merriam Company, Publishers Springfield, Massachusetts, U.S.A.

*Primary Examiner*—Henry F. Epstein
*Attorney, Agent, or Firm*—Stephen E. Feldman; Marvin Feldman

[57] ABSTRACT

A part, such as finial or the like, is molded of plastic material so that during the molding process there is formed within the part a bore having internal threads formed therein for a predetermined extent of its length and so as to terminate a predetermined distance in from the entry end into the bore from the base of the part. A circular recess, surrounding the entry end of the bore, and a number of rectangular indentations, are also formed in the base during the molding of the part; which is molded with the parting line of the molded parts in a plane that includes the axis line of the bore and the internal threads.

The molding machine parts are formed to insure uniform and precise threads by locating the cavities, within which the parts are molded, all equally distant from the gate; and by forming cooling water tracks in predetermined positions with respect to the mold parts and cavities. A motor and suitable gearing are provided to rotate the externally threaded mold cores in the proper direction to separate the externally threaded mold cores from the internally threaded molded parts.

2 Claims, 6 Drawing Figures

DETACHABLE FINIAL LAMP PART

BACKGROUND OF THE INVENTION —FIELD OF APPLICATION

This invention relates to parts molded of plastic; and more particularly to plastic molded parts with internally threaded bores and a machine and process for molding such parts.

BACKGROUND OF THE INVENTION —DESCRIPTION OF THE PRIOR ART

There is no question that more and more items are being made from plastic; and that wherever possible such items are being molded because the molding process can be automated to produce such items in a relatively inexpensive manner. Quite often the item to be molded of plastic is the complete item itself like a tube, box, or container. Sometimes it constitutes a part which is to be combined with other items to form the end product. Quite often the item to be molded includes an internally threaded bore such as one would find in a cap, or a finial for a lamp fixture, or the like.

The molding of parts from plastic with integrally molded internally threaded bores has presented considerable problems associated with the separation of the externally threaded core from the internal threads of the molded parts. Such problems quite often result in poorly or improperly formed threads; and either breakage or other inability to use the molded part, because of the thread imperfections. Additional imperfections in the molded parts, and delays and difficulties in the molding process, result from poor or improper heating and cooling of the mold and molded parts.

Some of the available molding equipment for molding parts of plastic with internally threaded bores, such as that shown and described in U.S. Pat. No. 3,084,387 granted on Apr. 9, 1963 to I. A. Tochner et al. for Molding Apparatus and such as that shown in U.S. Pat. No. 3,091,810 granted on June 4, 1963 to E. D. Turner for Injection Moulding Machines, are highly expensive and complex pieces of equipment.

Alternatively available equipment, such as that shown and described in U.S. Pat. No. 2,457,336 granted on Dec. 28, 1948 to G. C. Wilson for Injection Mold and in U.S. Pat. No. 3,719,446 granted on Mar. 6, 1973 to B. T. Cleevely for Mold Assembly For Producing Threaded Article With Unscrewing Means Integral With The Assembly; while not as complex, still have not cured the problems of poor and/or improper thread formation and equipment which is relatively expensive in cost and operation.

All of the previously described types of plastic molding equipment, in addition, separate the molds so as to part same along a line perpendicular to the axis of the internally threaded bore and of the internal threads. This too has been found to create problems in the thread formation and the resulting molded parts.

SUMMARY OF THE INVENTION

It is therefore an object of this invention to provide a new and improved part molded of plastic, and with internally and integrally molded threads formed within a bore during the molding process.

It is yet another object of this invention to provide a new and improved method of molding internal threads within a bore of a plastic part during the part molding process.

It is yet still another object of this invention to provide a new and improved arrangement for internally molded threads formed within the bore of a plastic part during the molding thereof.

It is yet still a further object of this invention to provide new and improved equipment for molding internally threaded plastic parts.

It is yet still another object of this invention to provide a new and improved process for molding internally threaded plastic parts.

This invention involves internally threaded plastic parts and the process and equipment for molding same; and contemplates forming such parts with the internal threads starting a predetermined distance in from the entry end of the bore within which the threads are so formed; and in and with equipment, and a process, that provides for parting the mold along a plane which includes the axis line of the threaded bore and the threads.

Other objects, features, and advantages of the invention in its details of construction and arrangement of parts will be seen from the above, from the following description of the preferred embodiment when considered with the drawing and from the appended claims.

DESCRIPTION OF THE PREFERRED EMBODIMENT

For convenience the invention will be described as applied to a molding machine and process for simultaneously molding 16 plastic parts, in the form of finials of predetermined configuration for use with lamp fixtures, wherein each finial is molded with an internally threaded bore extending up from its base, and wherein the mold cavities are arranged in two parallel rows of eight cavities each. It should be understood, nevertheless, that without departing from the scope of this invention: that the parts may be molded of any convenient plastic; that the part may be any type of part, and be molded to any appropriate configurations as long as it includes an internally threaded bore; that the bore can extend inwardly from any any selected surface of the part; and that the molds can be provided with any desired number of cavities arranged in any one of many appropriate arrays.

Figure 1:
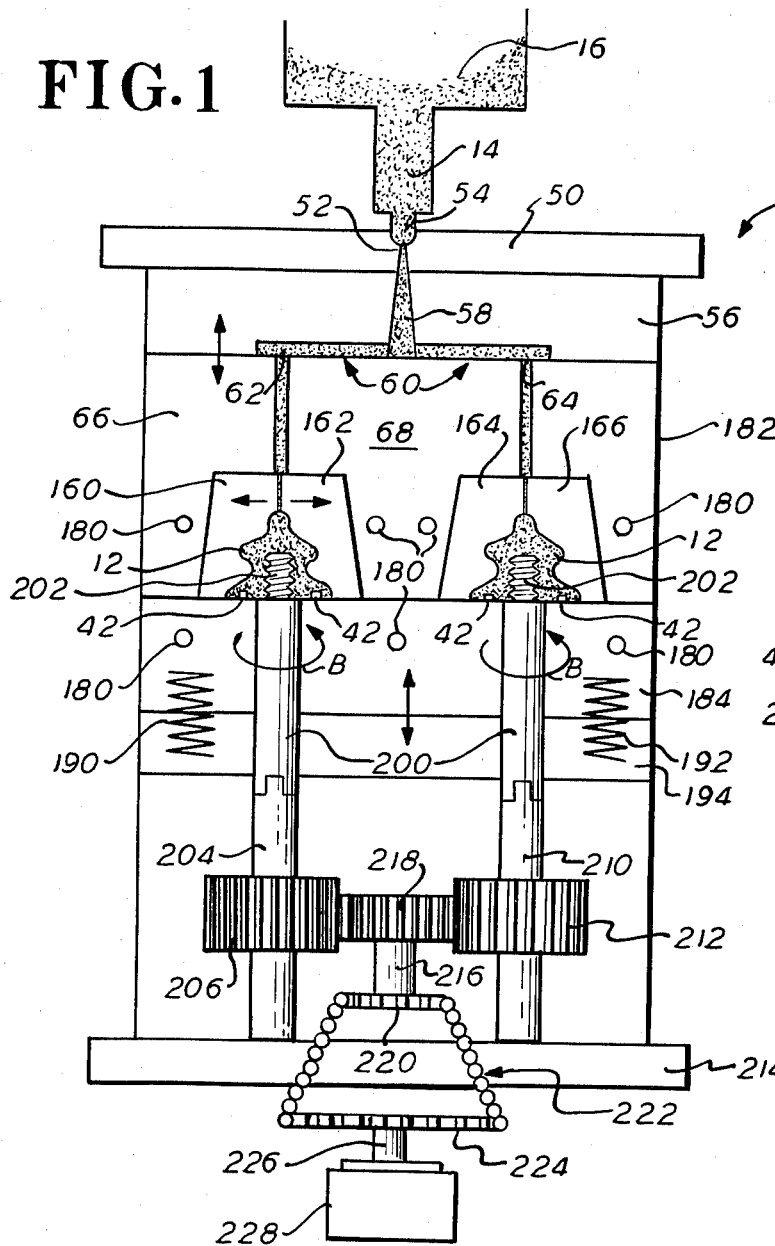
FIG. 1 is a schematic showing of a molding machine for molding internally threaded parts of plastic incorporating the instant invention.

With reference to FIG. 1 there is generally shown at 10 a machine for molding parts 12 of suitable plastic 14 injected into machine 10 from and by a plastic injection machine 16.

Figure 3:
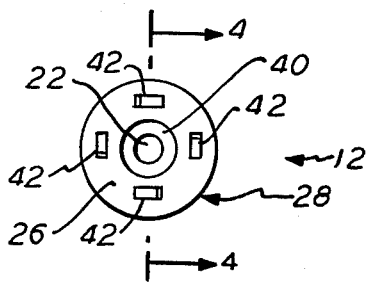
FIG. 3 is a bottom plan view of the finial of FIG. 2.

Parts 12 may be for any purpose and of any convenient configuration; but in the preferred embodiment parts 12 are in the configuration of, and what are commonly used as, finials. Each finial 12(FIGS. 1 and 2) has an ornamented external configuration 20(FIGS. 2 and 4) and an internal bore 22(FIGS. 3 and 4) with threads 24 integrally formed therein. Threads 24 start from a place a predetermined distance "X" (FIG. 4) up from the surface 26 of base 28 of finial 12, and extend up bore 22 a predetermined distance depending up the part upon which finial 12 is to be placed. A circular recess 40 is also molded into surface 26 of base 28; as are four substantially rectangular indentations 42.

By starting threads 24 a predetermined distance up from the surface 26 of base 28, and especially up a predetermined distance from the base surface of circular recess 40, the integrity of full and complete molded threads is insured. When plastic molded internally formed threads extend right to the edge of the bore there is a greater probability of poor or damaged thread formation. Subsequent use of the part either becomes impossible, or may result in part breakage due to improper forces set up when threading the part into position.

Figure 6:
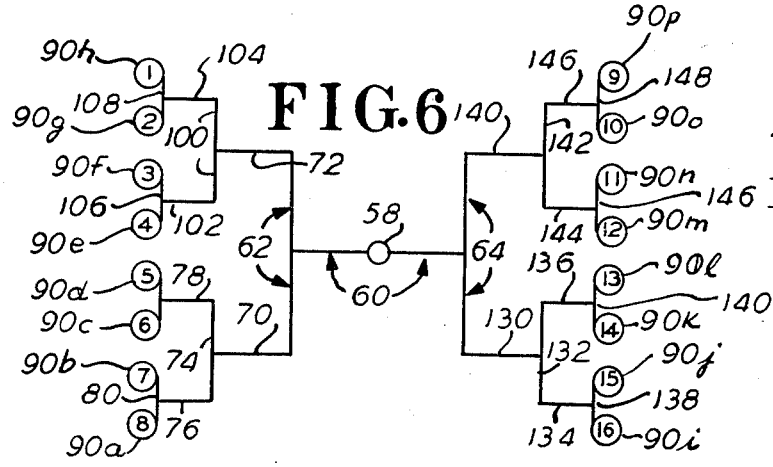
FIG. 6 is a schematic flow diagram for the molding material of the machine of FIG. 5 showing the gate, runners, and mold cavities for molding 16 parts.
Figures 2, 5:
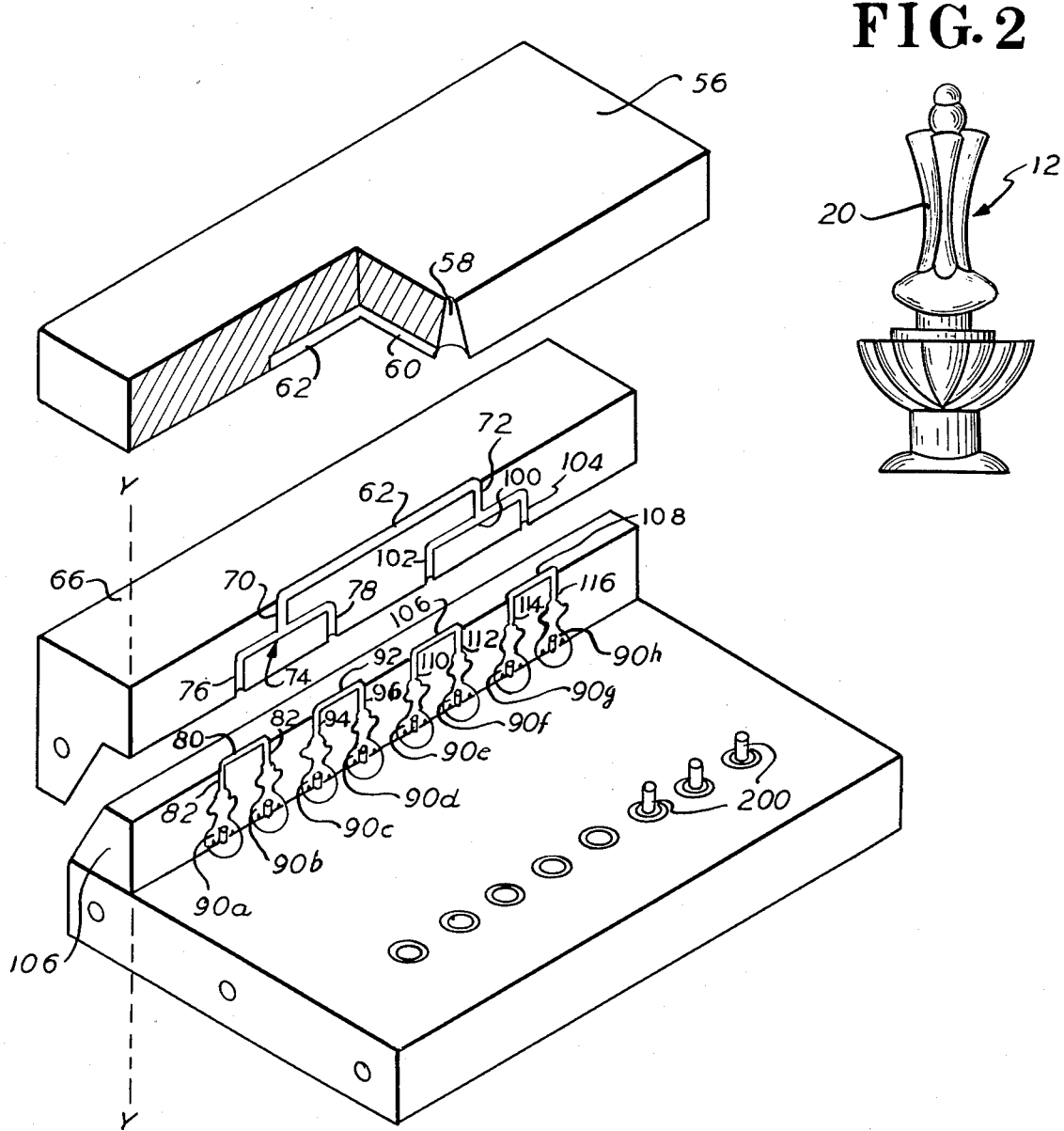
FIG. 2 is an elevational view of a plastic part in the form of a finial incorporating the instant invention and which is formed on the molding machine of FIG. 1.
FIG. 5 is a schematic perspective showing of some of the parts of the molding machine of FIG. 1, exploded and broken away in part and with parts removed to better show details thereof.

Molding machine 10 includes a top plate 50 (FIGS. 1 and 5) formed with a centrally disposed aperture 52 disposed for alignment with a nozzle 54 (FIG. 1) of injection machine 16. A gating plate 56 (FIGS. 1 and 5) is disposed beneath top plate 50 and with its gate 58 aligned with aperture 52. A runner 60 extends equal distances in opposite directions from gate 58 and into communication with a runner 62 (FIGS. 5 and 6) disposed at one end of runner 60, and a runner 64 (FIG. 6) disposed at the other end of runner 60. Runner 62 may be formed in plate 56, in an aligned portion of a left side mold retaining piece 66 and in an aligned portion of a center mold retaining piece 68, if forming same in that manner suits the plastic to be used and other features of. molding machine 10. Alternatively runner 62 may be formed in any one or more of such pieces of machine 10. The primary feature of runner 62 is that it extend equal distances from its communication with a pair of runners 70, 72 (FIGS. 5 and 6). Runner 70 extends into and communicates with a runner 74 that extends equal distances in opposite directions to communicate with runners 76, 78. Runner 76, in turn communicates with a runner 80 that extends equal distances to communicate with runners 82, 84 which communicate with mold cavities 90a and 90b respectively.

In similar manner runner 78 communicate with runner 92 which, in turn communicates with runners 94 and 96 that communicate with mold cavities 90c and 90d respectively. Runner 72 extends equal distances there from to communicate with runners 102 and 104 which, in turn, communicate with runners 106, and 108 respectively. Runner 106 communicates with runners 110, 112 which in turn communicate with mold cavities 90e and 90f respectively; while runner 108 communicates with runners 114, 116 which communicate with mold cavities 90g and 90h respectively.

Similarly runner 64 communicates with mold cavities 90i, 90j, 90k, 90l through runners 130, 132, 134, 136, 138, and 140; and mold cavities 90m, 90n, 90o and 90p through runners 140, 142, 144, 146, and 148.

It should be noted that all cavities 90a through 90p are located to be equal distances from gate 58 to insure uniform and precise thread formation. Mold cavities 90a through 90h are formed in a pair of mold parts 160, 162 (FIG. 1), with one half of the mold cavity in each mold part; and so that the mold parting line is in a plane y—y (FIG. 5) that includes the axis line z—z (FIG. 4) for bores 22 and threads 24 formed in finials 12 molded in mold cavities 90a through 90h. In like manner mold cavities 90i through 90p are formed in a pair of mold parts 164, 166 with one half of the mold cavity in each mold part; and so that the mold parting line is in a plane (like plane y—y) that includes the axis line z—z for bores 22 and threads 24 formed in finials 12 molded in mold cavities 90i through 90p.

A number of cooling-water tracks 180 are formed in left side retaining piece 68, a right side retaining piece 182, and a bottom part 184. Tracks 180 are sized and located so as to provide the most efficient heat and cooling control for mold parts 160, 162, 164, 166 and the molded parts 12 within mold cavities 90a through 90p. A number of springs 190, 192 coact with bottom part 184 and a support part 194 in the operation of machine 10.

Extending up from bottom part 184 and support part 194 and into each mold cavity 90a through 90p are a plurality of mold cores 200 (FIGS. 1 and 5); their being one mold core 200 for each mold cavity. The upper potion of each mold core 200 has formed thereabout external threads 202 of a size and configuration to provide the proper size and configuration for molded threads 24. The mold cores 200 that extend into cavities 90a through 90h coact with drive shafts 204 which have fixedly connected thereto gears 206. The mold cores 200 which extend into cavities 90i through 90p coact with drive shafts 210 which have fixedly connected thereto gears 212. Extending upwardly from a bottom part 214 are main shafts 216 with drive gears 218 fixedly disposed thereon. A drive sprocket 220 is carried by each such shaft 216; while a drive chain 222 meshes with all such sprockets 220 to transmit thereto the drive from a motor sprocket 224 carried by the shaft 226 of a motor 228.

Suitable and conventional means are provided to connect motor 228 to a source of electrical or other energy, and for controlling the operation thereof along with the means for operating injection machine 16 and the parts of molding machine 10 to provide an integrated and interrelated operation for parts 12.

In operating machine 10 the mold parts and other parts are set in position with all runners cleaned out and with the gate, runners, mold cavities and mold cores prepared to receive a suitable plastic. Injection machine 16 is operated and an appropriate quantity of molten plastic is injected from nozzle 54 through gate 58 and into the runners so as to flow evenly and uniformly into mold cavities 90a through 90p. When the cavities are full, and after an appropriate cooling period during which cooling water flows through tracks 180, the parts are separated so that mold parts 160, 162 and mold parts 164 and 166 are parted along their respective parting planes y—y. Included in this operation is the actuation of motor 228 which through sprocket 224, drive chain 223 and sprockets 220, drives gears 218. These, in turn, drive gears 204 and 212 to turn drive shafts 204 and 210 and their respective mold cores 200 in the direction of arrows "B" (FIG. 1). This action facilitates separation of the threaded ends of mold cores 200 from the threads 24 molded into parts 12.

Figure 4:
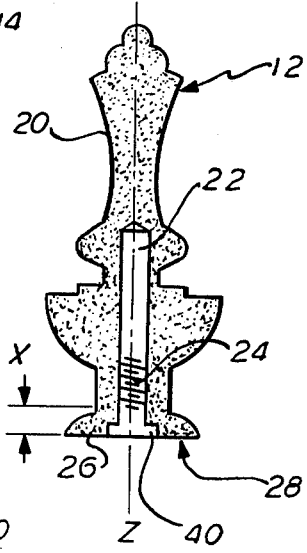
FIG. 4 is a vertical sectional view of the finial taken along line 4—4 of FIG. 3.

It should be noted that the configuration of the end of mold cores 200 that extend into mold cavities 90a through 90p as shown in FIG. 1 is only schematic. That the actual configuration of such mold core ends will be of a configuration to provide the bore 22, threads 24 and other formation to be molded into part 12 (such as shown in FIG. 4).

From the above description it will their be seen that there has been provided a novel and improved machine and method for molding internally threaded plastic parts, and that there has been provided a novel and improved configuration for the threads within such parts, which machine, method and thread configuration provide a relatively efficient and inexpensive part with a precise thread formation.

It is understood that although I have shown the preferred form of my invention that various modifications may be made in the details thereof without departing from the scope as comprehended by the following claims:

I claim:

1. A detachable finial lamp part comprising a body of integral one-piece molded plastic construction and being formed with undercut sides and a base comprising;
   (a) a bore molded into said body extending from the base surface thereof along an axis line; and
   (b) screw threads molded into the surface of said bore to a limited extent thereof;
   (c) said screw threads starting at a distance into said bore spaced from said base surface; wherein said base surface is integrally formed with at least one circular recess formed therein and being disposed about said bore.

2. The part of claim 1 wherein said body has a mold parting line and the plane of the molding parting line includes said axis line of said bore and threads.

* * * * *